No. 733,030. PATENTED JULY 7, 1903.
H. T. GOSS.
GRAIN DRIER.
APPLICATION FILED MAR. 7, 1902.
NO MODEL. 2 SHEETS—SHEET 1.

WITNESSES: INVENTOR
Harry T. Goss
BY
ATTORNEYS

No. 733,030. PATENTED JULY 7, 1903.
H. T. GOSS.
GRAIN DRIER.
APPLICATION FILED MAR. 7, 1902.
NO MODEL. 2 SHEETS—SHEET 2.
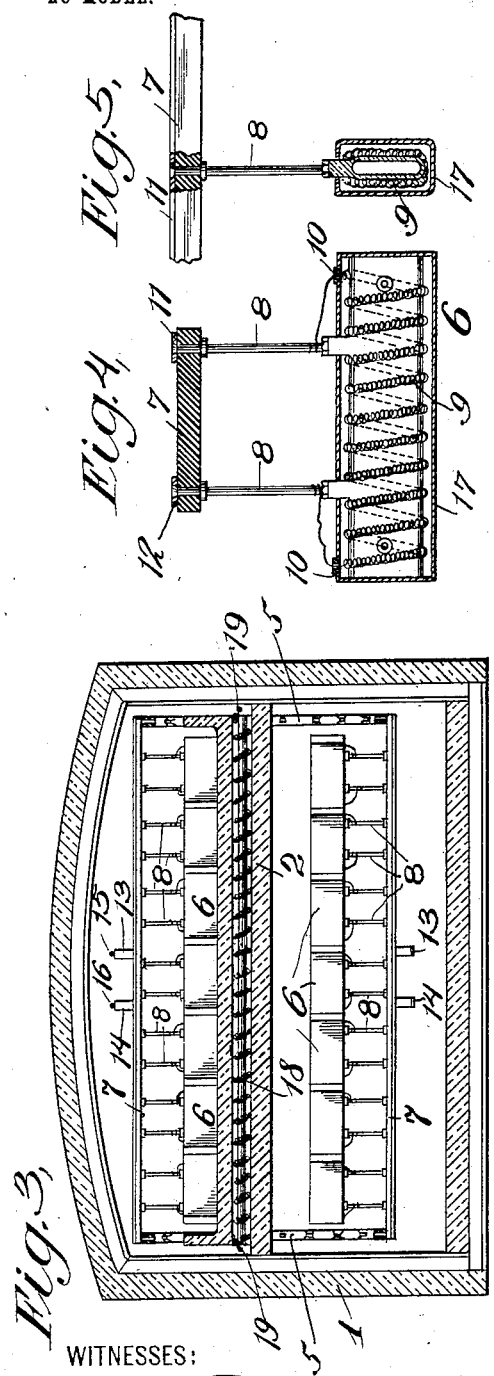
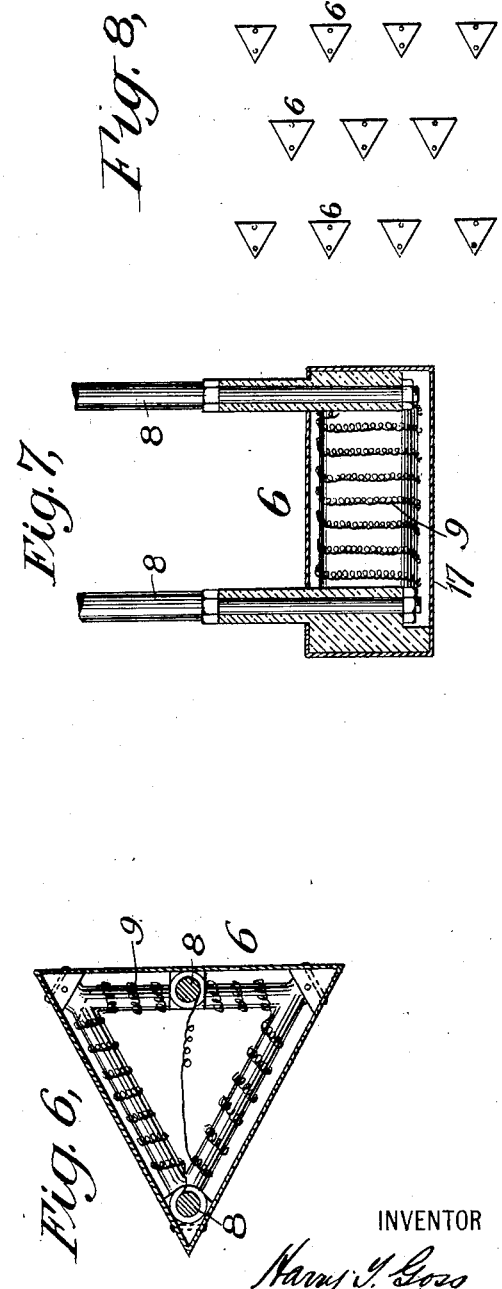
WITNESSES:
INVENTOR
Harry T. Goss
BY
Chapin Hayward & Marble
his ATTORNEYS No. 733,030. Patented July 7, 1903.

UNITED STATES PATENT OFFICE.

HARRY T. GOSS, OF RUTHERFORD, NEW JERSEY, ASSIGNOR TO DANIEL S. GOSS, OF CHICAGO, ILLINOIS.

GRAIN-DRIER.

SPECIFICATION forming part of Letters Patent No. 733,030, dated July 7, 1903.

Application filed March 7, 1902. Serial No. 97,129. (No model.)

*To all whom it may concern:*

Be it known that I, HARRY T. GOSS, a citizen of the United States of America, residing at Rutherford, county of Bergen, State of New Jersey, have invented certain new and useful Improvements in Grain-Driers, of which the following is a specification, reference being had to the accompanying drawings, forming a part thereof.

My invention relates to grain-driers, and particularly to apparatus suitable for the drying or cooking of oats.

My invention consists in a certain new and improved apparatus wherein grain may be dried or cooked electrically, and to this end comprises a suitably-inclosed chamber in which is arranged a bed for receiving the grain and a plurality of traveling conveyer-blades adapted to move over said bed, the said bed or conveyer-blades, or both, being electrically heated.

The object of my invention is to dry grain more thoroughly, economically, and efficiently than heretofore.

My invention further consists in certain details of construction and combination of parts, as will hereinafter be fully set forth.

I will now describe an apparatus embodying my invention and will then point out the novel features in claims.

Figure 1:
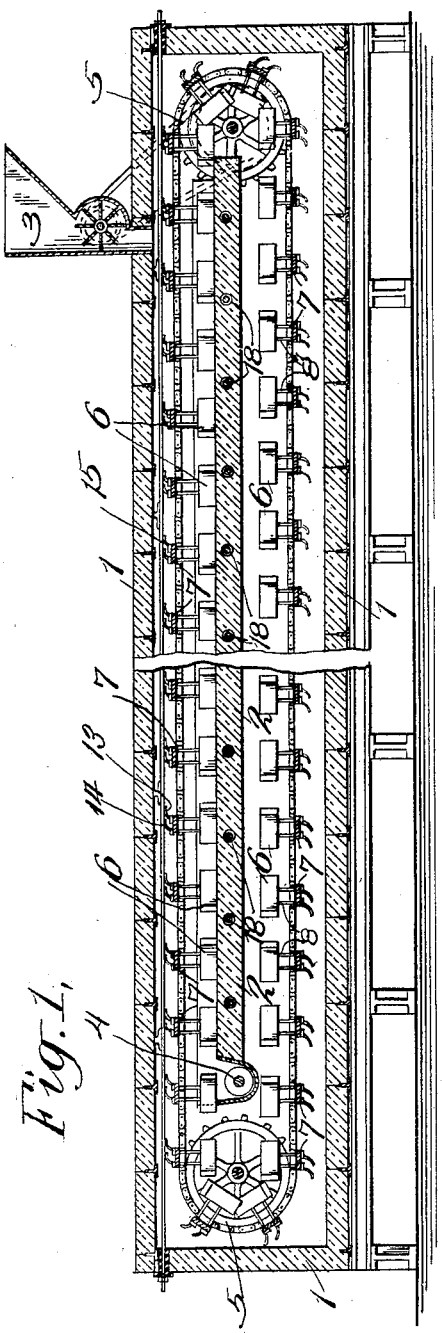
Figure 2:
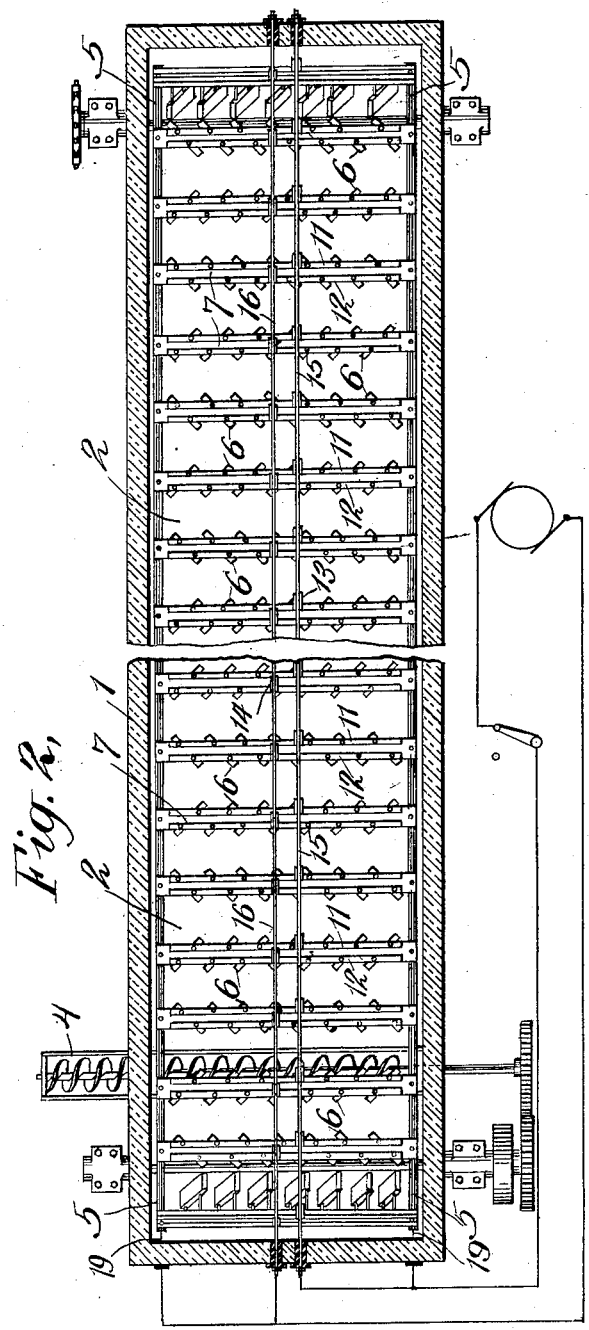

In the drawings, Figure 1 is a view in vertical longitudinal section of a grain-drier embodying my invention. Fig. 2 is a view in horizontal section of the same. Fig. 3 is a view in transverse vertical section thereof, said view being on a somewhat larger scale than that of Figs. 1 and 2. Fig. 4 is a detail view in horizontal section, on a further enlarged scale, of one of the conveyer-blades employed. Fig. 5 is a detail view of the same in transverse section. Fig. 6 is a detail view in horizontal section of another form of conveyer-blade employed. Fig. 7 is a detail view of the same in transverse section. Fig. 8 is a diagrammatic view showing the preferred arrangement of the blades or teeth when that form of same illustrated in Figs. 6 and 7 is employed.

In carrying out my invention a shell or casing 1 is provided, which may be constructed of any suitable refractory material. A bed 2 is arranged within the chamber inclosed by the shell or casing 1 and upon which the grain to be dried may be received.

A feed-hopper 3 is arranged at or near one end of the drier and through which grain may be delivered to the bed 2, and a screw conveyer 4, arranged at or near the opposite end of the drier, is adapted to carry away the grain from the drier after it has been cooked or dried. The grain delivered to the bed 2 is distributed thereover, stirred, and advanced by means of a traveling conveyer or movable rake provided with a plurality of conveyer blades or teeth, certain of which have sides arranged at an angle to the sides of others.

In the construction shown herein the conveyer-blades or rake-teeth and which are designated by the reference character 6 are supported by endless carrier-chains arranged to pass around sprocket-wheels 5 and by which they may be driven. In the example of my invention illustrated in Figs. 1 to 4, inclusive, there are two such carrier-chains employed and two sets of sprocket-wheels. The conveyer-blades are secured to transverse bars 7, carried by the said chains, and are arranged in series, the alternate series having opposite inclinations. The said conveyer-blades, one of which is shown in detail in Figs. 4 and 5, are preferably formed of some refractory material and comprise a substantially rectangular plate, from which two stems or supports 8 project and by which the said blades are secured to the transverse bars 7. Electrical heating-coils 9 are carried by the blades 6 and connect with terminals 10. An inclosing metallic casing 17 for each blade may conveniently be employed. The various terminals of the opposite poles of each series of blades are in multiple electric connection with wires or strips 11 and 12, and the wires 11 and 12 of each series carry contact-strips 13 and 14. Feed-wires 15 and 16 in circuit with a generator are arranged above the bed 2 and in the path of movement of the contact-strips 13 and 14 when the conveyer-blades or rake-teeth are passing over the bed 2.

In operation the grain is fed through the hopper 3 onto the bed 2 and the carrier-chains carrying the conveyer-blades or rake-teeth 6 are gradually advanced, while a current of electricity is fed to the wires 15 and 16. The conveyer-blades will operate upon the grain and will toss and tumble the particles from side to side, while at the same time advancing them slowly. The contact-strips 13 and 14 of those blades which are so operating will at such times be in contact with the feed-wires 15 and 16, and electric circuit being closed through the heating-coils therein the blades by contact with the grain will dry and cook same to the desired degree. The action of the blades in tossing and tumbling the grain from side to side will bring all the particles successively into contact with the blades, so that the drying and cooking will be uniform and thorough. The grain will be gradually advanced by the movement of the conveyer-blades until it is finally received by the transverse screw conveyer 4 and conveyed away. The speed at which the grain is carried through the drier may be regulated by the speed of movement of the conveyer-blades or movable rake or by the inclination of the sides of the blades or rake-teeth. As the conveyer-blades 6 pass away from the bed 2 the contact-strips 13 and 14 may be arranged to withdraw from contact with the feed-wires 15 and 16, so that the said blades will only be heated while they are operating upon the grain.

If desired, the bed may also be heated, and for such purpose I have shown electrical heating-coils 18, connected with feed-wires 19. The feed-wires will be in circuit with the generator, and suitable rheostats, switches, and the like (not shown) may be provided to control the currents, all in a manner too well known to require illustration or detail description herein.

In Figs. 6 and 7 a form of conveyer-blade or rake-tooth is illustrated in which the sides of each blade or tooth have opposite inclinations. In such case the blades or teeth will preferably be arranged in staggered series, as diagrammatically shown in Fig. 8—that is to say, each series of blades or teeth will be opposite the spaces between the blades or teeth of the next succeeding series.

I do not desire to be limited to the precise details of construction or combination of parts as herein set forth, as they may obviously be varied within wide limits without departing from the spirit and scope of my invention.

What I claim is—

1. In a grain-drier, the combination with a suitable bed for receiving the grain, of a traveling carrier-chain, a plurality of conveyer-blades carried thereby, arranged to move over said bed, and individual heating devices for the several blades.

2. In a grain-drier, the combination with a suitable bed for receiving the grain, and electrical heating-coils embedded within same, of a traveling carrier-chain, a plurality of conveyer-blades carried thereby, arranged to move over said bed, and individual heating devices for the several blades.

3. In a grain-drier, the combination with a suitable bed for receiving the grain, of a traveling carrier-chain, a plurality of conveyer-blades carried thereby, arranged to move over said bed, and electrical heating-coils carried by the said blades.

4. In a grain-drier, the combination with a suitable bed for receiving the grain, of a traveling carrier-chain, a plurality of conveyer-blades carried thereby, arranged to move over said bed, electrical heating-coils carried by the said blades, and contacts for connecting said heating-coils to electrical conductors.

5. In a grain-drier, the combination with movable stirring means for the grain, said means adapted to be electrically heated, of contact portions carried by the said stirring means, and relatively stationary electrical contact portion adapted to engage said first-named contact portions, during certain periods in their movements only.

6. In a grain-drier, the combination with a suitable bed for receiving the grain, of traveling carrier-chains, blades carried thereby and adapted to travel in one direction over the said bed and to return in the opposite direction away from said bed, heating-coils contained in said blades or teeth, and means whereby electricity may be supplied to said heating-coils only during the time they are adjacent to said bed.

7. In a grain-drier, the combination with a suitable bed for receiving the grain, means for feeding the grain thereto and means for conveying the grain therefrom, of a traveling carrier-chain, a plurality of conveyer-blades carried thereby, arranged to move over said bed, and to advance the grain thereon from the point at which it is received to the point at which it is conveyed away, and electrical heating-coils carried by the said blades.

8. In a grain-drier, the combination with a suitable bed for receiving the grain and electrical heating-coils embedded within same, of a traveling carrier-chain, a plurality of conveyer-blades carried thereby, arranged to move over said bed, electrical heating-coils carried by said blades, and means for constantly supplying electricity to the coils of the said bed, and for intermittently supplying electricity to the coils of the said blades.

HARRY T. GOSS.

Witnesses:
C. F. CARRINGTON,
M. M. CONOVER.